United States Patent
Kobayashi (10) Patent No.: US 10,442,739 B2
(45) Date of Patent: Oct. 15, 2019

(54) POROUS PLATE-SHAPED FILLER

(71) Applicant: NGK INSULATORS, LTD., Nagoya (JP)

(72) Inventor: Hiroharu Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 177 days.

(21) Appl. No.: 15/221,903

(22) Filed: Jul. 28, 2016

(65) Prior Publication Data

US 2017/0001919 A1 Jan. 5, 2017

Related U.S. Application Data (63) Continuation of application No. PCT/JP2015/053021, filed on Jan. 28, 2015.

(30) Foreign Application Priority Data

| Jan. 31, 2014 | (JP) | 2014-017071 |
| Jul. 4, 2014 | (JP) | 2014-138921 |
| Dec. 8, 2014 | (JP) | 2014-247932 |

(51) Int. Cl.
*C04B 38/00* (2006.01)
*C08K 7/24* (2006.01)
(Continued)

(52) U.S. Cl.
CPC ............ *C04B 38/009* (2013.01); *C04B 35/48* (2013.01); *C04B 35/488* (2013.01);
(Continued)

(58) Field of Classification Search
CPC ....... C08K 7/24–28; C01P 2004/20–22; C01P 2006/14–17; C04B 38/009; Y10T 428/2982; Y10T 428/2991–2998
See application file for complete search history.

(56) References Cited

U.S. PATENT DOCUMENTS 2,704,105 A * 3/1955 Robinson ............... H01B 3/002
423/328.2
3,225,131 A * 12/1965 Conklin ................. H01B 7/02
162/138
(Continued)

FOREIGN PATENT DOCUMENTS

JP 2002-160907 A1 6/2002
JP 2007-182491 A1 7/2007
(Continued)

OTHER PUBLICATIONS

Definition of the term "contiguous" from the Oxford English Dictionary, retrieved May 2018.*
Definition of the term "contiguous" from Merriam-Webster Dictionary, retrieved May 2018.*
Definition of the term "contiguous" from MacMillan Dictionary, retrieved May 2018.*
International Search Report and Written Opinion (Application No. PCT/JP2015/053021) dated Apr. 28, 2015.
(Continued)

*Primary Examiner* — Z. Jim Yang
(74) *Attorney, Agent, or Firm* — Burr & Brown, PLLC (57) ABSTRACT

Provided is a porous plate-shaped filler that can be used as a material for a heat-insulation film having excellent heat insulation performance. In a porous plate-shaped filler 1 having a plate shape, an aspect ratio is 3 or higher, a minimum length is 0.5 to 50 μm, and an overall porosity is 20 to 90%, and the porosity is lower in the circumferential part than in the center part. When this porous plate-shaped filler 1 of the present invention is contained in a heat-insulation film, the infiltration of a matrix into the filler is reduced, and thus the thermal conductivity can be lowered. Therefore, even a thin heat-insulation film can have a greater heat-insulation effect than before.

8 Claims, 3 Drawing Sheets

(51) Int. Cl.

| | | |
|---|---|---|
| *F02F 1/42* | (2006.01) | |
| *C04B 35/488* | (2006.01) | |
| *C04B 35/622* | (2006.01) | |
| *C04B 35/626* | (2006.01) | |
| *C04B 35/638* | (2006.01) | |
| *C04B 35/48* | (2006.01) | |
| *C04B 35/634* | (2006.01) | |
| *C04B 38/06* | (2006.01) | |
| *C09K 21/02* | (2006.01) | |
| *F01N 13/08* | (2010.01) | |
| *F01N 13/14* | (2010.01) | |
| *C04B 111/00* | (2006.01) | |
| *C04B 111/28* | (2006.01) | |

(52) U.S. Cl.
CPC ........ *C04B 35/622* (2013.01); *C04B 35/6264* (2013.01); *C04B 35/62625* (2013.01); *C04B 35/638* (2013.01); *C04B 35/6342* (2013.01); *C04B 38/068* (2013.01); *C08K 7/24* (2013.01); *C09K 21/02* (2013.01); *F01N 13/08* (2013.01); *F01N 13/14* (2013.01); *F02F 1/4264* (2013.01); *C01P 2006/14* (2013.01); *C01P 2006/17* (2013.01); *C04B 2111/00405* (2013.01); *C04B 2111/28* (2013.01); *C04B 2235/3244* (2013.01); *C04B 2235/60* (2013.01); *C04B 2235/6025* (2013.01); *C04B 2235/656* (2013.01); *C04B 2235/6567* (2013.01); *C04B 2235/661* (2013.01); *C04B 2235/775* (2013.01); *C04B 2235/9607* (2013.01); *C04B 2237/341* (2013.01); *C04B 2237/348* (2013.01); *C04B 2237/58* (2013.01); *C08K 2201/004* (2013.01); *C08K 2201/016* (2013.01); *F05C 2251/048* (2013.01); *F05C 2253/12* (2013.01); *Y10T 428/2982* (2015.01); *Y10T 428/2991* (2015.01)

(56) References Cited

U.S. PATENT DOCUMENTS

| | | | | | |
|---|---|---|---|---|---|
| 4,660,861 | A * | 4/1987 | Argy | ............... | F16L 59/029 285/45 |
| 4,744,802 | A * | 5/1988 | Schwabel | ............ | B82Y 30/00 51/309 |
| 4,913,966 | A * | 4/1990 | Garvey | ............ | B01J 20/103 264/125 |
| 5,072,886 | A * | 12/1991 | Morrison | ............ | B01J 23/04 241/1 |
| 5,213,591 | A * | 5/1993 | Celikkaya | ............ | B24D 3/16 51/293 |
| 9,643,379 | B1 * | 5/2017 | McKnight | ............ | B32B 3/08 |
| 2003/0038278 | A1 * | 2/2003 | Ishihara | ............ | H01L 23/15 252/500 |
| 2003/0235693 | A1 * | 12/2003 | Oishi | ............ | C01F 5/14 428/422.8 |
| 2004/0052976 | A1 * | 3/2004 | Buczek | ............ | B05D 1/40 427/598 |
| 2004/0202835 | A1 * | 10/2004 | Gronroos | ............ | C09C 3/10 428/195.1 |
| 2005/0109238 | A1 * | 5/2005 | Yamaki | ............ | B32B 7/02 106/287.16 |
| 2005/0182153 | A1 * | 8/2005 | Yokoi | ............ | C09D 7/70 523/122 |
| 2005/0208338 | A1 * | 9/2005 | Fernie | ............ | C23C 30/00 428/701 |
| 2006/0153769 | A1 * | 7/2006 | Robinson | ............ | C01F 7/02 423/625 |
| 2006/0257662 | A1 * | 11/2006 | Bujard | ............ | C09C 1/0015 428/404 |
| 2007/0098803 | A1 * | 5/2007 | Dobbs | ............ | A61K 9/14 424/489 |
| 2007/0259185 | A1 * | 11/2007 | Hingst | ............ | B32B 18/00 428/408 |
| 2007/0281160 | A1 * | 12/2007 | Krishna | ............ | B01D 69/02 428/403 |
| 2008/0171811 | A1 * | 7/2008 | Guiselin | ............ | B01J 21/04 523/216 |
| 2009/0038797 | A1 * | 2/2009 | Skala | ............ | C09K 8/80 166/280.1 |
| 2009/0163362 | A1 * | 6/2009 | Yener | ............ | B01J 21/04 502/439 |
| 2009/0169816 | A1 * | 7/2009 | Erickson | ............ | B01J 2/22 428/142 |
| 2009/0235591 | A1 * | 9/2009 | Yener | ............ | B24D 11/00 51/308 |
| 2009/0238982 | A1 * | 9/2009 | Florent | ............ | C03C 17/007 427/387 |
| 2010/0055459 | A1 * | 3/2010 | Desimone | ............ | B81C 99/0095 428/402 |
| 2010/0056816 | A1 * | 3/2010 | Wallin | ............ | B01D 67/0041 549/534 |
| 2010/0104873 | A1 * | 4/2010 | Wang | ............ | B01J 21/08 428/406 |
| 2010/0151195 | A1 * | 6/2010 | Culler | ............ | B24D 11/00 428/142 |
| 2010/0303875 | A1 * | 12/2010 | Vanpoulle | ............ | A01N 25/12 424/405 |
| 2011/0040013 | A1 * | 2/2011 | Tsapatsis | ............ | B01D 69/148 524/430 |
| 2011/0114870 | A1 * | 5/2011 | Yang | ............ | C04B 26/10 252/62 |
| 2011/0151182 | A1 | 6/2011 | Tsunemori et al. | | |
| 2011/0226990 | A1 * | 9/2011 | Glennon | ............ | B01J 20/283 252/184 |
| 2012/0171449 | A1 * | 7/2012 | Lin | ............ | B29D 7/01 428/220 |
| 2012/0183775 | A1 * | 7/2012 | Shinba | ............ | C09C 3/10 428/403 |
| 2012/0216719 | A1 * | 8/2012 | Hagar | ............ | C09D 7/00 106/636 |
| 2013/0180180 | A1 * | 7/2013 | Yener | ............ | C09K 3/1436 51/309 |
| 2013/0186005 | A1 * | 7/2013 | Kavanaugh | ............ | B29C 48/154 51/309 |
| 2013/0203328 | A1 * | 8/2013 | Givot | ............ | B24D 5/02 451/548 |
| 2013/0212952 | A1 * | 8/2013 | Welygan | ............ | C09K 3/1409 51/309 |
| 2013/0236725 | A1 * | 9/2013 | Yener | ............ | C09K 3/1418 428/402 |
| 2013/0260139 | A1 * | 10/2013 | Kamada | ............ | C03C 17/007 428/328 |
| 2013/0289133 | A1 * | 10/2013 | Doshita | ............ | C01B 33/12 514/769 |
| 2013/0305618 | A1 * | 11/2013 | Maezawa | ............ | C09K 3/1409 51/309 |
| 2014/0038859 | A1 * | 2/2014 | Skala | ............ | C09K 8/80 507/269 |
| 2014/0050925 | A1 * | 2/2014 | Sueda | ............ | C01G 9/02 428/402 |
| 2014/0109490 | A1 * | 4/2014 | Boden | ............ | C04B 35/10 51/309 |
| 2014/0128500 | A1 * | 5/2014 | Oohori | ............ | C08L 23/12 523/200 |
| 2014/0182216 | A1 * | 7/2014 | Panzarella | ............ | C09K 3/1409 51/309 |
| 2014/0213687 | A1 * | 7/2014 | Yamazaki | ............ | A61K 6/083 523/115 |
| 2014/0287658 | A1 * | 9/2014 | Flaschberger | ............ | B24D 3/14 451/47 |
| 2014/0348559 | A1 * | 11/2014 | Miyahara | ............ | G03G 15/2057 399/333 |
| 2015/0007399 | A1 * | 1/2015 | Gonzales | ............ | A61K 8/25 15/104.93 |

(56) References Cited

U.S. PATENT DOCUMENTS

| | | | | |
|---|---|---|---|---|
| 2015/0010721 A1* | 1/2015 | Tanida | ................. | H05K 5/0086 |
| | | | | 428/34.5 |
| 2015/0089881 A1* | 4/2015 | Stevenson | ............ | C09K 3/1409 |
| | | | | 51/309 |
| 2015/0104626 A1 | 4/2015 | Tomita et al. | | |
| 2015/0118482 A1* | 4/2015 | Kagawa | ................. | B32B 27/08 |
| | | | | 428/323 |
| 2015/0291865 A1* | 10/2015 | Breder | ................. | C09K 3/1409 |
| | | | | 51/309 |
| 2015/0315442 A1* | 11/2015 | Hofius | ................. | C09K 3/1427 |
| | | | | 51/308 |
| 2016/0015652 A1* | 1/2016 | John | ........................ | B01J 13/22 |
| | | | | 424/490 |
| 2016/0185074 A1* | 6/2016 | Kagawa | ............. | H01L 23/3737 |
| | | | | 428/341 |
| 2016/0289521 A1* | 10/2016 | Colet | ................... | C09K 3/1409 |

FOREIGN PATENT DOCUMENTS

| | | | |
|---|---|---|---|
| JP | 2011-052630 | A1 | 3/2011 |
| WO | 2010/023957 | A1 | 3/2010 |
| WO | 2013/191263 | A1 | 12/2013 |

OTHER PUBLICATIONS

Extended European Search Report (Application No. 15744047.0) dated Jul. 27, 2017.

European Office Action, European Application No. 15744047.0, dated Jun. 11, 2019 (5 pages).

* cited by examiner

POROUS PLATE-SHAPED FILLER

BACKGROUND OF THE INVENTION

1. Field of the Invention

The present application is an application based on JP-2014-017071 filed on Jan. 31, 2014 with Japan Patent Office, JP-2014-138921 filed on Jul. 4, 2014 with Japan Patent Office, and JP-2014-247932 filed on Dec. 8, 2014 with Japan Patent Office, the entire contents of which are incorporated herein by reference.

The present invention relates to a porous plate-shaped filler.

2. Description of Related Art

There is a need for a heat-insulation film to be formed on a surface so as to improve heat insulation efficiency or flame resistance. Patent Document 1 discloses an internal combustion engine that includes a structural member whose heat insulation performance is improved. The internal combustion engine of Patent Document 1 is constituted such that a heat insulating material is arranged adjacent to the inner wall of an exhaust passage and a high-temperature working gas (exhaust gas) flows along the flow passage formed by the heat insulating material. In the heat insulating material, the respective particles of mesoporous silica spherical (MSS) particles with an average particle diameter of 0.1 to 3 μm are stacked while the particles are densely gathered together via a bonding material. In the MSS particle, countless mesopores with an average pore diameter of 1 to 10 nm are formed. The heat insulation performance is exhibited accordingly.

In Patent Document 2, use of a porous plate-shaped filler which is in the shape of a plate with an aspect ratio of 3 or higher, with a minimum length of 0.1 to 50 μm and a porosity of 20 to 99% for a heat-insulation film is disclosed. According to Patent Document 2, the heat insulating property is exhibited by a coating film (insulation film) to be formed by dispersing the porous plate-shaped filler in an organic resin binder, an inorganic polymer binder, or an organic inorganic composite binder.

CITATION LIST

Patent Documents

[Patent Document 1] JP-A-2011-52630
[Patent Document 2] WO 2013/191263

SUMMARY OF THE INVENTION

Problem to be Solved by the Invention

However, when the particles or filler described in Patent Document 1 or Patent Document 2 is used, a matrix component like binder infiltrates pores of the particles or filler so that the heat-insulation effect of the pores is weakened and thermal conductivity of the heat-insulation film is increased. Thus, a filler with higher heat-insulation effect is in need.

An object of the present invention is to provide a porous plate-shaped filler that can be used as a material for a heat-insulation film having excellent heat insulation performance.

Means for Solving the Problem

The inventors of the present invention found that the above-described problems can be solved by having, on a circumferential part of a porous plate-shaped filler, a layer which is different from the center part. According to the present invention, a porous plate-shaped filler described below is provided.

According to a first aspect of the present invention, a porous plate-shaped filler having a plate shape with an aspect ratio of 3 or higher, a minimum length of 0.5 to 50 μm, and an overall porosity of 20 to 90%, wherein the porosity is lower at the circumferential part than in the center part is provided.

According to a second aspect of the present invention, the porous plate-shaped filler according to the first aspect is provided, wherein the center part and the circumferential part have the same type of material for a base material.

According to a third aspect of the present invention, the porous plate-shaped filler according to the first aspect is provided, wherein the center part and the circumferential part have a different type of material for a base material.

According to a fourth aspect of the present invention, the porous plate-shaped filler according to the first or third aspects is provided, wherein the type of material of the circumferential part contains at least one of a fluororesin, a silicone resin, a polyimide resin, a polyamide resin, an acrylic resin, and an epoxy resin.

According to a fifth aspect of the present invention, the porous plate-shaped filler according to any one of the first to fourth aspects is provided, wherein the circumferential part has a porosity which is lower by 10% or more than the center part.

According to a sixth aspect of the present invention, the porous plate-shaped filler according to any one of the first to fifth aspects is provided, wherein the average pore diameter is smaller at the circumferential part than in the center part.

According to a seventh aspect of the present invention, the porous plate-shaped filler according to any one of the first to sixth aspects is provided, wherein the average pore diameter of the circumferential part is 0.1 μm or less.

According to an eighth aspect of the present invention, the porous plate-shaped filler according to any one of the first to seventh aspects is provided, wherein the thickness of the circumferential part is 1 μm or more.

Effect of the Invention

The porous plate-shaped filler having a plate shape with an aspect ratio of 3 or higher, a minimum length of 0.5 to 50 μm, and an overall porosity of 20 to 90%, in which the porosity is lower in the circumferential part than in the center part, exhibits an excellent heat insulation performance. Thus, compared to a case in which a porous plate-shaped filler having the center part and circumferential part with same porosity is used, the heat-insulation film containing the porous plate-shaped filler of the present invention has less infiltration of a matrix component like binder into a filler, and thus the thermal conductivity can be lowered. Accordingly, even a thin heat-insulation film exhibits a better heat insulation performance and has a greater heat-insulation effect than before.

DETAILED DESCRIPTION OF THE INVENTION

Hereinafter, embodiments of the present invention will be described with reference to the drawings. The present invention is not limited to the following embodiments, and changes, modifications and improvements can be added to the embodiments without departing from the gist of the invention.

Figure 1A:
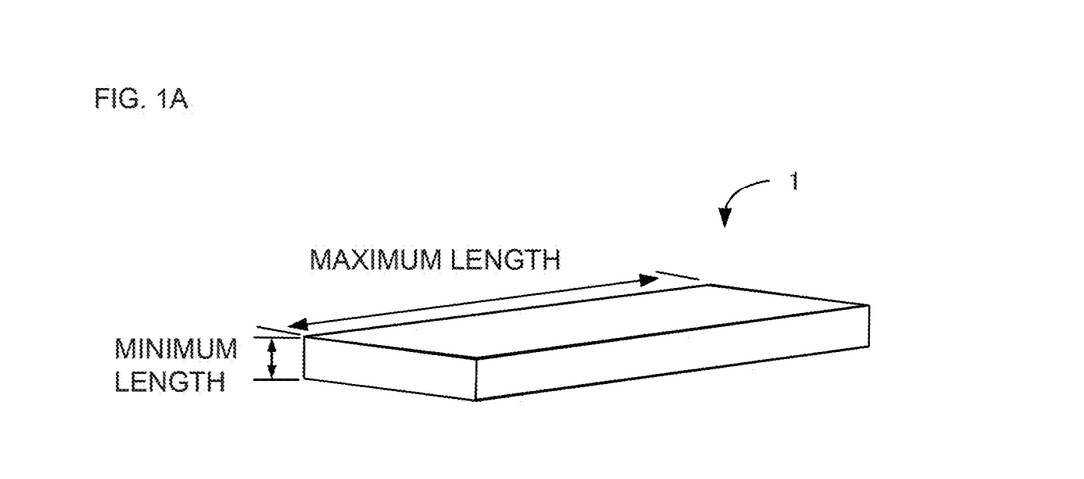
FIG. 1A is a perspective view showing schematically one embodiment of the porous plate-shaped filler of the present invention.
Figure 1B:
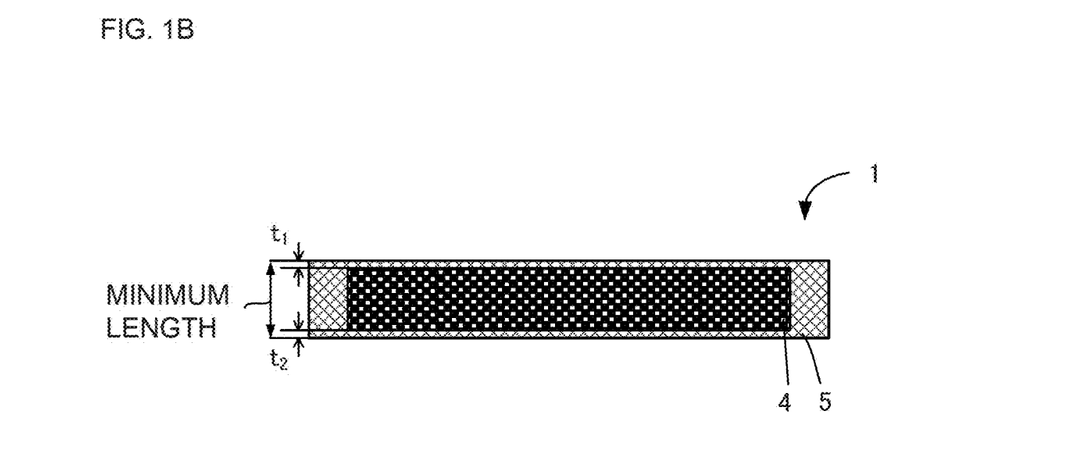
FIG. 1B is a drawing for explaining the circumferential part and center part of the porous plate-shaped filler of the present invention.
Figure 1C:
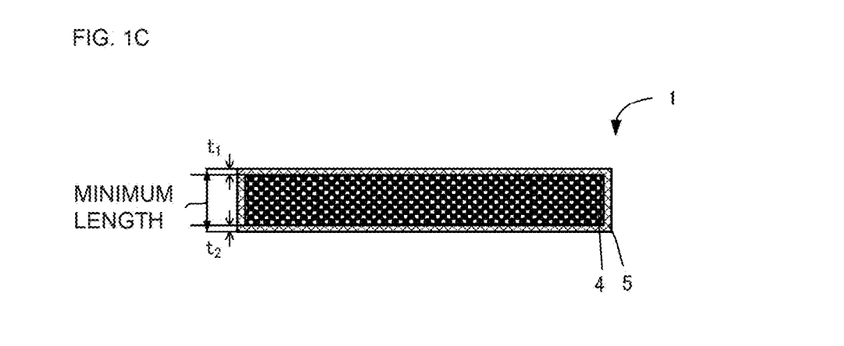
FIG. 1C is a cross-sectional view showing the porous plate-shaped filler of another embodiment of the present invention.

[1] Porous Plate-shaped Filler:

In FIG. 1A, one embodiment of the porous plate-shaped filler 1 is shown. The porous plate-shaped filler 1 of the present invention has a plate shape with an aspect ratio of 3 or higher and has a minimum length of 0.5 to 50 μm and an overall porosity of 20 to 90%, in which the porosity is lower in the circumferential part 5 than in the center part 4. The porous plate-shaped filler 1 contains a base material and pores. A layer in which the type of the base material is different from the center part 4 of the porous plate-shaped filler 1 (materials are different) is the circumferential part 5, and the circumferential part 5 has lower porosity than the center part 4. In other words, if the materials are of different types and the type of material is specified from the center part 4 to the circumference, a region starting from the change to the outermost circumference is referred to as the circumferential part 5. When the porous plate-shaped filler 1 is formed with single type of a base material (the center part 4 and the layer on the outer side have the same type of material), a part reduced inwards by 80% analogous to the outer frame of the porous plate-shaped filler 1 is taken as the center part 4 and the remaining outer 20% is taken as the circumferential part 5 (FIG. 1B). The circumferential part 5 has lower porosity than the center part 4. However, depending on a production method or the like, even in a case in which the center part 4 and the outer layer have the same material or a different material, the circumferential part 5 which is in vertical direction to the minimum length direction (horizontal direction in the drawing) may be thinner than the 20% (FIG. 1C). Thus, the porosity of the circumferential part 5 is preferably measured in the minimum length direction.

In this description, the aspect ratio is defined by the maximum length/the minimum length of the porous plate-shaped filler 1. Here, the maximum length is the maximum length of the particle (the porous plate-shaped filler 1) when the particle is sandwiched by a pair of parallel surfaces. The minimum length is similarly the minimum length of the particle when the particle is sandwiched by a pair of parallel surfaces, and it corresponds to a so-called thickness in the case of a flat plate shape. The plate shape of the porous plate-shaped filler 1 includes not only a flat plate shape (plate that is flat and not curved) but also a curved plate shape or a plate shape with a non-constant thickness (minimum length) insofar as the aspect ratio is 3 or higher and the minimum length is 0.5 to 50 μm. The porous plate-shaped filler 1 may be a fiber-like, needle-like, or billet shape and the like. Among these shapes, the porous plate-shaped filler 1 of the present invention is preferred to have a flat plate shape. Additionally, the surface shape of the plate may be any shape of a square shape, a quadrangular shape, a triangular shape, a hexagonal shape, a circular shape, and the like. Namely, the porous plate-shaped filler 1 may have any shape as long as it has a flat plate shape.

The aspect ratio of the porous plate-shaped filler 1 is preferably 3 or higher. As the aspect ratio becomes higher, the heat transfer path is elongated due to refraction so that the thermal conductivity of the heat-insulation film 3 is lowered at the time of forming the heat-insulation film 3. However, if the aspect ratio is excessively high, handling is difficult during production and the yield may be also deteriorated. For example, if the minimum length is reduced to increase the aspect ratio, it may not be possible to have sufficient strength. On the other hand, if the maximum length is increased, the porous plate-shaped filler 1 becomes large and can be broken. Thus, the aspect ratio is more preferably 3 or higher and 50 or lower, even more preferably 3.5 or higher and 40 or lower, and most preferably 4 or higher and 30 or lower.

The minimum length of the porous plate-shaped filler 1 is 0.5 to 50 μm, more preferably 0.5 to 20 μm, even more preferably 2 to 15 μm, and most preferably 5 to 15 μm. If it is 0.5 to 50 μm, the aspect ratio increases so that lamination can be easily achieved at the time of forming the heat-insulation film 3 and the thermal conductivity can be lowered. Furthermore, if it is 5 to 50 μm, the minimum length increases so that the porous plate-shaped filler 1 with sufficient strength can be obtained, which is also suitable in terms of handling and having high yield. By having the minimum length of 0.5 μm or more, the porous plate-shaped filler 1 with sufficient strength can be obtained and it is suitable in terms of handling. Specifically, if the porous plate-shaped filler 1 is excessively thin, there can be a case in which it is difficult to maintain the shape of the porous plate-shaped filler 1 during the process for producing the porous plate-shaped filler 1. However, by having the minimum length of 0.5 μm or more, the strength required for preventing breakage of the porous plate-shaped filler 1 during steps for preparing the porous plate-shaped filler 1 as a coating composition for forming a heat insulation film can be obtained. Furthermore, by having the minimum length of 50 μm or less, a laminate can be easily formed when the heat-insulation film 3 containing the porous plate-shaped filler 1 is formed while maintaining a thickness which is sufficient for exhibiting the heat insulation property. When the porous plate-shaped filler 1 is excessively thick, the number of the laminated porous plate-shaped fillers 1, which are contained in the heat-insulation film 3 at the time of forming the heat-insulation film 3, is decreased so that the heat transfer path may become a straight line and get shortened and higher thermal conductivity of the heat-insulation film 3 may be yielded.

The porous plate-shaped filler 1 preferably has an overall porosity of 20 to 90%. By having the overall porosity of 90% or less, the strength can be obtained. In the present description, the overall porosity of a filler is obtained by the following formula.

$$\text{Porosity (\%)} = (1 - (\text{apparent particle density/true density})) \times 100$$

In the above-described formula, the apparent particle density is measured with a liquid immersion method using mercury. The true density is measured with a pycnometer method after sufficiently pulverizing the porous plate-shaped filler 1.

The overall porosity of the porous plate-shaped filler 1 is preferably 20 to 90%, more preferably 40 to 85%, and even more preferably 50 to 80%. If the porosity is excessively low, the filler may have high thermal conductivity. On the other hand, if the porosity is excessively high, the filler may have low strength.

In the porous plate-shaped filler 1, the porosity of the circumferential part 5 is preferably lower than the porosity of the center part 4. Preferably, it is lower by 10% or more. Particularly preferably, it is lower by 20% or more. In the present description, the porosities of the center part 4 and the circumferential part 5 are measured by using an image of a microstructure which is obtained by sampling a cross-section parallel to the minimum length of a filler by FIB and observing it by FE-SEM. The measurement is carried out for 10 random fillers, and after obtaining the average, porosity is obtained for each.

According to the porous plate-shaped filler 1, the average pore diameter of the circumferential part 5 is preferably smaller than that of the center part 4. More preferably, the average pore diameter of the circumferential part 5 is 0.1 μm or less. In the present description, the pore diameters of the center part 4 and the circumferential part 5 are measured by using an image of a microstructure which is obtained by sampling a cross-section parallel to the minimum length of a filler by FIB and observing it by FE-SEM. The measurement is carried out for 10 random fillers, and after obtaining the average, porosity is obtained for each.

It is preferable that the circumferential part 5 has a thickness of 1 μm or more. It is noted that the thickness of the circumferential part 5 is, in the minimum length direction, the upper thickness $t_1$ or the lower thickness $t_2$ of the center part 4 (see, FIGS. 1B and 1C). The thickness of the circumferential part 5 is more preferably 1 to 10 μm, and even more preferably 1 to 7 μm. As it is set at 1 μm or more, infiltration of the matrix 3m into the center part 4 can be prevented. For example, even in a case in which a large pore is present in the circumferential part 5, the matrix 3m cannot infiltrate the center part 4 if the thickness of the circumferential part 5 is set at 1 μm or more. On the other hand, as the circumferential part 5 is 10 μm or less, it is possible to prevent an increase of a region with low porosity, that is, a region with high thermal conductivity. Namely, as the thickness of the circumferential part 5 is within the aforementioned range, the heat-insulation effect can be exhibited more favorably.

When the aforementioned porous plate-shaped filler 1 is contained in the heat-insulation film 3 as described below, the heat-insulation effect can be enhanced.

Hereinbelow, as an embodiment of the porous plate-shaped filler 1 in which the circumferential part 5 has lower porosity than the center part 4, the first embodiment and the second embodiment are described.

[1-1] First Embodiment:

In the first embodiment, the center part 4 and the circumferential part 5 of the porous plate-shaped filler 1 preferably have the same type of material for a base material. In addition, even for a case in which an additive is contained in the porous plate-shaped filler 1, if the center part 4 and the circumferential part 5 have the same type of material for a base material, it is encompassed by the first embodiment. For the center part 4 of a filler which is used as a heat insulation material, a material with low thermal conductivity is used. By using the same material for the circumferential part 5, a filler with low thermal conductivity can be obtained.

Furthermore, to determine whether the base material has the same type of material or not, for each of the center part 4 and the circumferential part 5, an element analysis (EDS) is performed by observation with FE-SEM and determination is made to see whether the same kind of elements is detected or to find out the composition of a part other than pores. For example, if Zr and O are mainly detected, it is determined to be a material of Zr and O (zirconia). In that case, even when a small amount of Si is detected as an additive or an impurity, it is determined to be a material of Zr and O (zirconia) as long as most of them are Zr and O.

When the center part 4 and the circumferential part 5 are formed of the same type of material, a material with low thermal conductivity is preferably used for both the center part 4 and the circumferential part 5, and accordingly, overall thermal conductivity of the porous plate-shaped filler 1 can be also lowered. When the center part 4 and the circumferential part 5 are formed of the same type of material, it can be an inorganic material, an organic material, or a composite material of an inorganic material and an organic material. Among them, an inorganic material such as zirconia, partially stabilized zirconia (for example, yttria partially stabilized zirconia, fully stabilized zirconia (for example, yttria fully stabilized zirconia), yttrium oxide, alumina, silica, titania, niobium oxide, strontium oxide, lanthanum oxide, zirconium, yttria, aluminum, silicon, titan, niobium, strontium, lanthanum, rare earth zirconate salt (for example, lanthanum zirconate), rare earth silicate (for example, yttrium silicate), niobium acid salt (for example, niobium acid strontium), mullite, mica, swellable mica, spinel, zircon, magnesia, ceria, silicon carbide, silicon nitride, aluminum nitride, strontium carbonate, smectite-based clay mineral such as montmorillonite, layered double oxide such as hydrotalcite is preferable. A metal oxide such as zirconia, partially stabilized zirconia (for example, yttria partially stabilized zirconia, fully stabilized zirconia (for example, yttria fully stabilized zirconia), yttrium oxide, alumina, silica, titania, niobium oxide, strontium oxide, or lanthanum oxide is preferable. It may be used either singly or in combination of two or more types. However, the materials of the center part 4 and the circumferential part 5 are not limited to them.

[1-2] Second Embodiment:

In the second embodiment, the center part 4 and the circumferential part 5 of the porous plate-shaped filler 1 preferably have different types of material for a base material. For the circumferential part 5, a material which is easily sintered at low temperature is preferably used. By using other material which is easily sintered at low temperature for the circumferential part 5, sintering (densification) progresses and a higher difference in porosity compared to the center part 4 can be achieved. When the center part 4 and the circumferential part 5 are formed of different types of material, the same material as the first embodiment can be used for the center part 4. The same material as the first embodiment can be also used for the circumferential part 5, and in addition, a metal such as iron, silver, nickel, copper, titan, chrome, manganese, cobalt, zinc, or molybdenum can be employed. In addition, a fluororesin, a silicone resin, a polyimide resin, a polyamide resin, an acrylic resin, an epoxy resin, and the like can be also employed. Among them, it is preferable to employ a fluororesin having a water repellent oil repellent property. However, the materials of the center part 4 and the circumferential part 5 are not limited to them.

[2] Method for Producing Porous Plate-shaped Filler:

The first embodiment of the method for producing the porous plate-shaped filler 1 of the present invention has a slurry preparing step for preparing a slurry for forming a green sheet and a slurry for forming a circumferential part, a green sheet forming step for forming a green sheet, a pulverizing step for pulverizing a green sheet, a circumferential part forming step for forming the circumferential part 5 of a filler, and a firing step for obtaining the porous plate-shaped filler 1 by firing the circumferential part 5.

The slurry preparing step is a step for preparing a slurry which is used for forming a green sheet containing ceramic powder and a pore former, and a slurry for forming a circumferential part. The green sheet forming step is a step for forming a green sheet by forming a slurry for forming a green sheet into a film shape. The pulverizing step is a step for pulverizing a green sheet to obtain a filler-shaped green sheet. The circumferential part forming step is a step for forming the circumferential part 5 on circumference of the formed filler-shaped green sheet to obtain a green sheet with two-layer structure. The firing step is a step for firing a green sheet with two-layer structure to obtain the porous plate-shaped filler 1. Furthermore, the pulverizing step may be performed after the circumferential part forming step.

Since the method for producing the porous plate-shaped filler 1 has each step described above, the porous plate-shaped filler 1 which can be used as a material for the heat-insulation film 3 with excellent heat insulation performance can be produced. Hereinbelow, each step is described in detail.

[2-1] Slurry Preparing Step:

A pore former, a binder, a plasticizer, a liquid medium, and the like are added to ceramic powder and mixed together by a ball mill and the like, so as to prepare a slurry for forming a green sheet and a slurry for forming a circumferential part.

As the ceramic powder, there can be used zirconia powder, partially-stabilized zirconia powder (such as yttria partially-stabilized zirconia powder), fully-stabilized zirconia powder (such as yttria fully-stabilized zirconia powder), alumina powder, silica powder, titania powder, lanthanum oxide powder, yttria powder, rare earth zirconate powder (such as lanthanum zirconate powder), rare earth silicate powder (such as yttrium silicate powder), niobate powder (such as strontium niobate powder), mullite powder, spinel powder, zircon particles, magnesia powder, yttria powder, ceria powder, silicon carbide powder, silicon nitride powder, aluminum nitride powder, and the like. Regarding these powder, not only one kind but also the combination of two or more kinds may be used. Additionally, the powder is not limited to dry powder, and may employ powder dispersed in water or an organic liquid medium in a colloidal state (sol state). As the pore former, there can be used latex particles, melamine resin particles, PMMA particles, polyethylene particles, polystyrene particles, carbon black particles, graphite, a foamable resin, a water absorbable resin, and the like in a spherical shape, a plate-like shape, a fiber-like shape, and the like. As the binder, there can be used a polyvinyl butyral resin (PVB), a polyvinyl alcohol resin, a polyvinyl acetate resin, a polyacrylic resin, and the like. As the plasticizer, there can be used dibutyl phthalate (DBP), dioctyl phthalate (DOP), and the like. As the liquid medium, there can be used xylene, 1-butanol, and the like.

To reduce the porosity of the circumferential part 5, the amount of a pore former is preferably reduced in the slurry for forming a circumferential part than the amount in the slurry for forming a green sheet. Furthermore, as for the ceramic powder used for the slurry for forming a circumferential part, it is preferable to select a material which is easily sintered at low temperature. It is preferable to use silica, zinc oxide, or the like, for example, but not limited thereto.

[2-2] Green Sheet Forming Step:

By performing a vacuum defoaming treatment for the slurry for forming a green sheet, the viscosity is adjusted to 100 to 10000 cps. Subsequently, using a doctor blade device, the green sheet is formed such that the thickness after firing is 0.5 to 100 μm, and it is cut into the outer shape of dimensions (0.5 to 200) mm×(0.5 to 200) mm.

[2-3] Pulverizing Step:

As for the method for pulverizing a green sheet, a green sheet can be pulverized at room temperature by using a dry type bead mill, a roller mill, and the like, for example. In particular, to obtain porous particles having a "plate shape with an aspect ratio of 3 or higher and a minimum length of 0.5 to 50 μm", it is preferable to sieve (classify) using an air flow type classifier. A filler-shaped green sheet is obtained by pulverizing the green sheet.

[2-4] Circumferential Part Forming Step:

Examples of a method for forming the circumferential part 5 include dip molding, sputtering, plating, fluid layer coating, and vibration coating, and it can be any one of those methods. However, explanations are given by having the dip molding as an example.

By dipping a filler-shaped green sheet produced in the above pulverizing step in slurry for forming a circumferential part which is prepared by the slurry forming step, the circumferential part 5 is formed. If the circumferential part 5 is formed before firing, pores are not formed yet due to the presence of a pore former, and thus infiltration of a slurry for forming a circumferential part into the center part 4 of the filler 1 can be prevented.

[2-5] Firing Step:

A condition for firing a green sheet with two-layer structure in which a slurry for forming a circumferential part is adhered can be suitably set. However, it is preferably 0.5 to 20 hours in air at 800 to 2300° C. More preferably, it is 5 to 20 hours at 800 to 1800° C. Most preferably, it is 5 to 20 hours at 800 to 1300° C.

Furthermore, the order for performing the pulverizing step, circumferential part forming step and firing step is not limited to the order in which the circumferential part forming step is performed after the pulverizing step, followed by the firing step. Specifically, it is possible that the firing step is performed after the pulverizing step, followed by the circumferential part forming step, or the pulverizing step is performed after the firing step, followed by the circumferential part forming step. When the circumferential part forming step is performed after the firing step, there is a possibility of having an impregnation by a slurry for forming a circumferential part into the pores of the center part 4 of the filler. However, since the impregnation amount is small, its effect on thermal conductivity of the produced porous plate-shaped filler 1 and the heat-insulation film 3 containing the filler 1 is minor.

[3] Heat-insulation Film:

The heat-insulation film 3 of the present invention contains the porous plate-shaped filler 1 of the present invention as a material. The heat-insulation film 3 exhibits excellent heat insulation performance.

Figure 2:
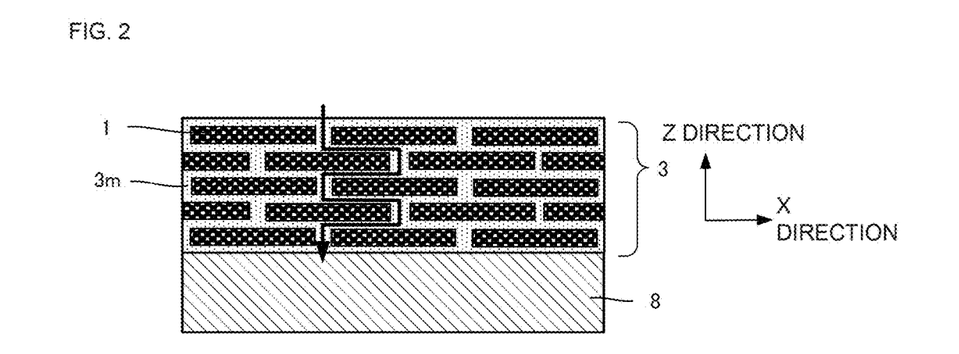
FIG. 2 is a cross-sectional view showing schematically one embodiment of the heat-insulation film of the present invention.

The heat-insulation film 3 is described by using FIG. 2. FIG. 2 is a cross-sectional view, which is parallel to the film thickness direction, showing schematically one embodiment of the heat-insulation film 3 of the present invention. The heat-insulation film 3 is formed on top of the substrate 8 and it has the porous plate-shaped fillers 1 of one embodiment of the present invention and the matrix 3m to disperse the porous plate-shaped filler 1. Namely, the porous plate-shaped fillers 1 are dispersedly arranged in the matrix 3m which binds the porous plate-shaped fillers 1. The matrix 3m is a component that is present in the peripheral area of the porous plate-shaped filler 1 or between those particles, and is a component for binding those particles together.

The heat-insulation film 3 of the present invention is preferred to have the porous plate-shaped fillers 1 arranged (stacked) in a layered state. Here, the arrangement in the layered state means that the multiple porous plate-shaped fillers 1 are present in the matrix 3m in an oriented state in which the direction of the minimum length of the porous plate-shaped filler 1 corresponds to the direction parallel to the thickness direction of the heat-insulation film 3. Here, it is to be noted that the positions (the positions of the center) of the porous plate-shaped fillers 1 need not to be orderly and periodically arranged in the X, Y, and Z directions (here, the Z direction is defined as the thickness (film thickness) direction) of the heat-insulation film 3, and there is no problem even if the positions of the porous plate-shaped fillers 1 are present randomly. While there is no problem as long as the number of stacked fillers is equal to or more than 1, the number of stacked fillers is preferably larger and preferably equal to or more than 5. Stacking the porous plate-shaped fillers 1 in the layered state in the heat-insulation film 3 ensures a long refracted heat transfer path so as to improve the heat-insulation effect. In particular, as shown in FIG. 2, the positions of the porous plate-shaped fillers 1 are preferred not to be orderly arranged in the Z direction (preferred to be arranged alternately) since the heat transfer path is refracted more and becomes longer.

As shown in FIG. 2, the portion of the matrix 3m with a high thermal conductivity becomes a main heat transfer path. However, the heat-insulation film 3 of the present invention includes the porous plate-shaped fillers 1, and the heat transfer path has many detours with respect to the direction (the thickness direction of the film) along which heat transfer is not desired. That is, since the length of the heat transfer path becomes long, the thermal conductivity can be decreased. The binding area of the porous plate-shaped fillers 1 via the matrix 3m is wider than that of spherical fillers. Accordingly, the strength of the entire heat-insulation film is increased. Thus, erosion, delamination, and the like are less likely to occur.

In the heat-insulation film 3 of the present invention, the matrix 3m preferably does not infiltrate the pores of the porous plate-shaped filler 1. That is because, when the matrix 3m with high thermal conductivity infiltrates the pores of the porous plate-shaped filler 1, thermal conductivity of the porous plate-shaped filler 1 increases and thermal conductivity of the heat-insulation film 3 also increases. In the porous plate-shaped filler 1, the circumferential part 5 has lower porosity than the center part 4 so that it is difficult for the matrix 3m to infiltrate the pores and the heat insulation performance of the heat-insulation film 3 is improved.

The heat-insulation film 3 of the present invention is preferred to include at least one of ceramic, glass, and resin as the matrix 3m. From the viewpoint of having good heat resistance, ceramic or glass is more preferred as the matrix 3m. More specifically, as the material to be the matrix 3m, there are, for example, silica, alumina, mullite, zirconia, titania, silicon nitride, silicon oxynitride, silicon carbide, silicon oxycarbide, calcium silicate, calcium aluminate, calcium aluminosilicate, aluminum phosphate, potassium aluminosilicate, glass, and the like. From the viewpoint of having low thermal conductivity, they are preferably amorphous. Alternatively, in the case in which the material of the matrix 3m is ceramic, aggregates of particulates with particle diameters of 500 nm or less are preferred as the matrix 3m. Using the aggregates of the particulates with particle diameters of 500 nm or less as the matrix 3m allows further lowering of the thermal conductivity. In the case in which the material to be the matrix 3m is a resin, there can be used a silicone resin, a polyimide resin, a polyamide resin, an acrylic resin, an epoxy resin, and the like, as the matrix 3m.

Regarding the heat-insulation film 3, it is preferable that the porosity of the entire heat-insulation film 3 is 10 to 90% and the porosity of the matrix 3m is 0 to 70%.

It is preferable that the heat-insulation film 3 has a thickness of 0.1 to 5 mm. By having this thickness, an heat-insulation effect can be obtained without exhibiting a negative effect on the characteristics of a substrate 8 coated with the heat-insulation film 3. Furthermore, the thickness of the heat-insulation film 3 can be selected within the above-described range as necessary in accordance with the usage of the heat-insulation film 3.

The heat-insulation film 3 preferably has thermal conductivity of 1.5 W/(m·K) or less, more preferably 1 W/(m·K) or less, and particularly preferably 0.5 W/(m·K) or less. By having such low thermal conductivity, the heat transfer can be inhibited.

The heat-insulation film 3 of the present invention may be used as the heat-insulation film 3 which is formed on a "surface constituting an engine combustion chamber", for example. Furthermore, the heat-insulation film 3 of the present invention may be also used as the heat-insulation film 3 which is formed on an "inner wall of an exhaust pipe of an automobile" or as the heat-insulation film 3 that may be used for blocking heat from a heat generation part.

The heat-insulation film 3 can be formed by applying the coating composition containing the porous plate-shaped fillers 1 over the substrate 8 (for example, a surface constituting an engine combustion chamber and an inner wall of an exhaust pipe of an automobile) followed by drying. After the drying, a heat treatment may also be performed to form the heat-insulation film 3. In that case, by repeating the coating and drying or heat treatment, a thick heat-insulation film 3 can be formed with lamination of the heat-insulation film 3 (laminate of heat-insulation film). Alternatively, it is possible to form the heat-insulation film 3 on a temporary substrate 8 and then remove the temporary substrate 8 to produce only the heat-insulation film 3 in a thin plate shape, and then the resulting heat-insulation film 3 is adhered or bonded to the target substrate 8 (substrate different from the "temporary substrate").

As for the coating composition, a composition containing the porous plate-shaped filler 1 and one or more kinds selected from a group consisting of an inorganic binder, an inorganic polymer, an oxide sol, and liquid glass can be used. Furthermore, the coating composition may also contain a dense filler, a viscosity modifier, a liquid medium, or a dispersing agent and the like.

Examples of the specific materials that are included in the coating composition include cement, bentonite, aluminum phosphate, silica sol, alumina sol, boehmite sol, zirconia sol, titania sol, tetramethyl orthosilicate, tetraethyl orthosilicate, polysilazane, polycarbosilane, polyvinyl silane, polymethylsilane, polysiloxane, polysilsesquioxane, geopolymer, sodium silicate, and the like.

As the substrate 8 for forming the heat-insulation film 3, there can be used metal, ceramic, glass, plastic, wood, cloth, paper, and the like. In particular, examples in which the substrate 8 is a metal include iron, iron alloy, stainless steel, aluminum, aluminum alloy, nickel alloy, cobalt alloy, tungsten alloy, copper alloy, and the like.

EXAMPLES

Hereinbelow, the present invention is described in detail based on Examples. However, the present invention is not limited to those examples.

Example 1

To zirconia powder as ceramic powder, carbon black as a pore former, a polyvinyl butyral resin (PVB) as a binder, dioctyl phthalate (DOP) as a plasticizer, and xylene and 1-butanol as a solvent were added, and the resultant was used as a raw material composition. Specifically, a slurry for forming a green sheet and a slurry for forming a circumferential part were prepared as two raw material compositions. The slurry for forming a green sheet has 6% by volume of zirconia powder, 6% by volume of carbon black, 7% by volume of a binder, 4% by volume of a plasticizer, and 77% by volume of a liquid medium. The slurry for forming a circumferential part has 9% by volume of zirconia powder, 3% by volume of carbon black, 7% by volume of a binder, 4% by volume of a plasticizer, and 77% by volume of a liquid medium.

Then, those two raw material compositions (slurry) were mixed by a ball mill for 30 hours. A vacuum defoaming treatment was performed for each so as to adjust the viscosity to 4 Pa·s. Subsequently, using the doctor blade device, the slurry for forming a green sheet was processed into film shape such that thickness after firing is 8 μm, thereby forming a green sheet. The green sheet was cut to have a dimension of 50 mm×50 mm (height×width). This formed body was then pulverized by using a dry type bead mill. The pulverized formed body was dipped in the slurry for forming a circumferential part to obtain a green sheet with two-layer structure. After degreasing it for 5 hours at 600° C. followed by firing at 1100° C. for 2 hours, the porous plate-shaped filler 1 was obtained.

According to the obtained the porous plate-shaped filler 1, diameter of $ZrO_2$ particle was 50 nm, average pore diameter was 0.13 μm, and the overall porosity was 62%. Furthermore, 20 fillers were arbitrarily selected from the obtained the porous plate-shaped fillers 1, and the average was calculated. As a result, it was found that the aspect ratio is 4 and the minimum length is 10 μm. Furthermore, since the thickness after firing was 8 μm and the minimum length after forming the circumferential part 5 was 10 μm in Example 1, thickness of the circumferential part 5 was turned out to be 1 μm (each of the upper thickness $t_1$ and the lower thickness $t_2$ in the center part 4 is 1 μm) (see, FIG. 1B).

Next, the matrix material (material to be the matrix 3*m*) and the porous plate-shaped filler 1 were admixed with each other at volume ratio of 20:80 to prepare a coating composition. Then, the coating composition was applied on an aluminum alloy as the substrate 8, dried and subjected to a heating treatment for 2 hours at 200° C. Accordingly, the heat-insulation film 3 (thickness of 150 μm) was formed on the substrate 8.

(Thermal Conductivity)

With laser flash double layer model, thermal conductivity was measured in thickness direction of the heat-insulation film 3. Thermal conductivity of 1.00 W/(m·K) or less was evaluated as excellent and graded "A", thermal conductivity of 1.01 to 1.59 W/(m·K) was evaluated as good and graded "B", thermal conductivity of 1.60 W/(m·K) or more was evaluated as unacceptable and graded "C", and results are shown in Table 1. Furthermore, the heat-insulation film 3 was prepared in an engine combustion chamber, and it was used as criteria for evaluating the presence or absence of an heat-insulation effect for having improved fuel ratio.

(Presence or Absence of Infiltration by Matrix)

Figure 3A:
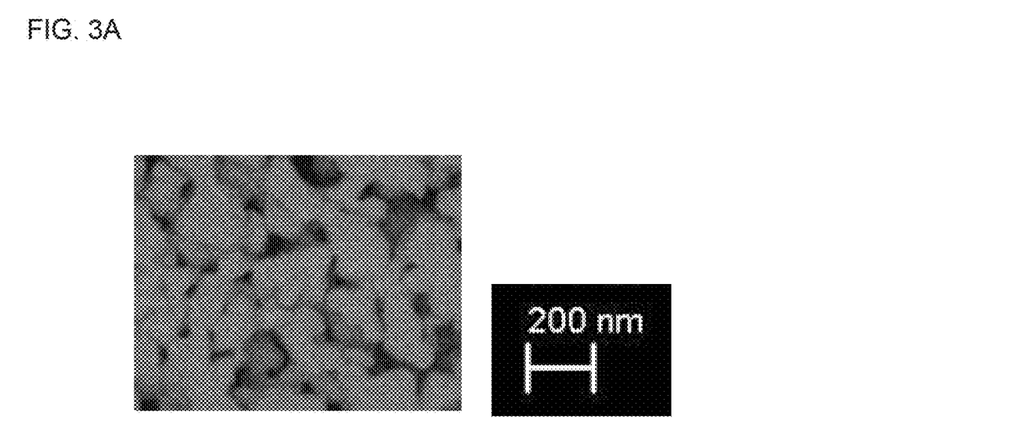
FIG. 3A is a SEM photographic image of a region near the center part of the porous plate-shaped filler in the heat-insulation film of Example 1.

A cross-sectional microstructure of the heat-insulation film 3 was sampled in film thickness direction by FIB and observed by FE-SEM. The SEM photographic image of Example 1 is shown in FIG. 3A. Center part of the porous plate-shaped filler 1 was observed. The matrix 3*m* with black color was not observed from the pores of the filler. Namely, the matrix 3*m* did not infiltrate into the center part of the porous plate-shaped filler 1.

Comparative Example 1

The slurry for forming a green sheet was processed by a doctor blade device to have a film shape such that it has thickness of 10 μm after firing, and thus a green sheet was formed. After performing the pulverization step, the firing was performed without carrying out the circumferential part forming step. Accordingly, the porous plate-shaped filler 1 was obtained. In Comparative Example 1, the circumferential part 5 was not formed.

Figure 3B:
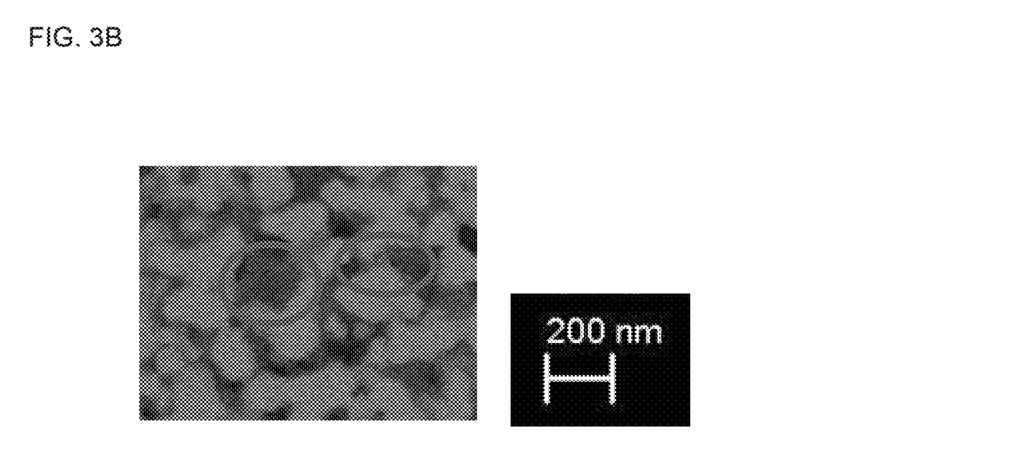
FIG. 3B is a SEM photographic image of a region near the center part of the porous plate-shaped filler in the heat-insulation film of Comparative Example 1.

The SEM photographic image of Comparative Example 1 is shown in FIG. 3B. Center part of the porous plate-shaped filler 1 was observed. Unlike Example 1, in FIG. 3B of Comparative Example 1, the matrix 3*m* with black color was observed in the pores of the filler. Namely, the matrix 3*m* has infiltrated into the center part of the porous plate-shaped filler 1.

Example 2

A slurry for forming a circumferential part was prepared while 12% by volume of zirconia powder with no addition of carbon black, 7% by volume of a binder, 4% by volume of a plasticizer, and 77% by volume of a liquid medium were combined. As for the slurry for forming a green sheet, the same slurry as the slurry of Example 1 was used. Furthermore, the porous plate-shaped filler 1 was produced in the same manner as in Example 1. The overall porosity of the porous plate-shaped filler 1 was 58%.

Examples 3 and 4

A slurry for forming a circumferential part was prepared while the ceramic powder of the slurry for forming a circumferential part is changed to $SiO_2$. The circumferential part forming step was performed before firing. Furthermore, in the slurry for forming a circumferential part of Example 3, 6% by volume of carbon black was added. In the slurry for forming a circumferential part of Example 4, carbon black was not added. Other than that, the porous plate-shaped filler 1 was produced in the same manner as in Example 1. The overall porosity of the porous plate-shaped filler 1 was 58% for Example 3 and 52% for Example 4.

Example 5

The circumferential part 5 was formed by non-electrolytic Ni plating. Other than that, the porous plate-shaped filler 1 was produced in the same manner as in Example 1. The overall porosity of the porous plate-shaped filler 1 was 52%.

Example 6

The slurry for forming a green sheet of Example 1 was processed by a doctor blade device to have a film shape such that it has thickness of 35 μm after firing, and thus a green sheet was formed. Then, by using the slurry for forming a circumferential part of Example 2, the circumferential part 5 was formed. The overall porosity of the porous plate-shaped filler 1 was 63%.

Example 7

The formed body produced in Example 4 was fired for 2 hours at 1200° C. The overall porosity of the porous plate-shaped filler 1 was 32%.

Examples 8 to 17

The porous plate-shaped filler 1 was produced in the same manner as in Examples 3 and 4, with the proviso that the thickness of green sheet was changed. Furthermore, while controlling the time for dipping the formed body, which has been obtained by cutting the green sheet, in a slurry for forming a circumferential part and drawing speed of the formed body, the thickness of the circumferential part 5 was modified. The aspect ratio, porosity or the like of the porous plate-shaped filler 1 are shown in Table 1.

Example 18

To zirconia powder as ceramic powder, carbon black as a pore former, a polyvinyl butyral resin (PVB) as a binder, dioctyl phthalate (DOP) as a plasticizer, and xylene and 1-butanol as a solvent were added, and the resultant was used as a raw material composition. Specifically, 2 slurries, that is, a slurry for forming a green sheet which is the same as Example 1 and a slurry for forming a circumferential part in which 2% by volume of a fluororesin and 98% by volume of a fluorine-based liquid medium are contained, were prepared.

Then, those two raw material compositions (slurry) were mixed by a ball mill for 30 hours. A vacuum defoaming treatment was performed for each so as to adjust the viscosity to 4 Pa·s. Subsequently, the slurry for forming a green sheet was formed into a green sheet in the same manner as in Example 1, and then the green sheet was cut to have a dimension of 50 mm×50 mm (height×width). It was then degreased for 5 hours at 600° C. followed by firing at 1100° C. for 2 hours. The fired article was then pulverized by using a dry type bead mill. After that, it was dipped in the slurry for forming a circumferential part (slurry containing fluororesin and fluorine-based liquid medium) to obtain the porous plate-shaped filler 1. The overall porosity of the porous plate-shaped filler 1 was 52%.

TABLE 1

| | Filler | | | | Material type | Center part of filler | | Circumferential part of filler | | Thermal conductivity of heat- | |
| --- | --- | --- | --- | --- | --- | --- | --- | --- | --- | --- | --- |
| | Aspect ratio | Overall porosity (%) | Minimum length (μm) | Thickness of circumferential part (μm) | of center part and circumferential part of filler | Porosity (%) | Pore diameter (μm) | Porosity (%) | Pore diameter (μm) | insulation film (W/(m · K)) | Evaluation |
| Comparative Example 1 | 4 | 65 | 10 | — | Same type | 65 | 0.13 | 65 | 0.13 | 1.80 | C |
| Example 1 | 4 | 62 | 10 | 1 | Same type | 65 | 0.13 | 50 | 0.09 | 1.10 | B |
| Example 2 | 4 | 58 | 10 | 1 | Same type | 65 | 0.13 | 30 | 0.09 | 0.50 | A |
| Example 3 | 4 | 58 | 10 | 1 | Different type | 65 | 0.13 | 30 | 0.07 | 0.70 | A |
| Example 4 | 4 | 52 | 10 | 1 | Different type | 65 | 0.13 | 1 | 0.05 | 0.50 | A |
| Example 5 | 4 | 52 | 10 | 1 | Different type | 65 | 0.13 | 1 | 0.04 | 0.60 | A |
| Example 6 | 4 | 63 | 40 | 3 | Same type | 65 | 0.13 | 30 | 0.09 | 0.50 | A |
| Example 7 | 4 | 32 | 10 | 1 | Different type | 40 | 0.13 | 1 | 0.05 | 1.00 | A |
| Example 8 | 8 | 52 | 10 | 1 | Different type | 65 | 0.13 | 1 | 0.05 | 0.45 | A |
| Example 9 | 20 | 52 | 10 | 1 | Different type | 65 | 0.13 | 1 | 0.05 | 0.35 | A |
| Example 10 | 4 | 52 | 5 | 1 | Different type | 65 | 0.13 | 1 | 0.05 | 0.40 | A |
| Example 11 | 4 | 52 | 7 | 1 | Different type | 65 | 0.13 | 1 | 0.05 | 0.50 | A |
| Example 12 | 4 | 52 | 50 | 5 | Different type | 65 | 0.13 | 1 | 0.05 | 1.45 | B |
| Example 13 | 4 | 22 | 10 | 1 | Different type | 30 | 0.13 | 1 | 0.05 | 1.45 | B |
| Example 14 | 4 | 72 | 10 | 1 | Different type | 75 | 0.13 | 60 | 0.05 | 0.40 | A |
| Example 15 | 4 | 86 | 10 | 1 | Different type | 90 | 0.13 | 70 | 0.05 | 0.35 | A |
| Example 16 | 4 | 52 | 10 | 1 | Different type | 65 | 0.13 | 1 | 0.13 | 0.52 | A |
| Example 17 | 4 | 52 | 10 | 1 | Different type | 65 | 0.13 | 1 | 0.20 | 0.55 | A |
| Example 18 | 4 | 52 | 10 | 1 | Different type | 65 | 0.13 | 1 | 0.05 | 0.50 | A |

The porous plate-shaped filler 1 of Examples 1 to 18 in which the porosity of the circumferential part 5 is lower than that of the center part 4 has lower thermal conductivity compared to Comparative Example 1, since the infiltration of the matrix 3*m* into the pores is reduced when it is prepared as the heat-insulation film 3. When Example 4 is compared to Examples 8 and 9, it was found that the thermal conductivity of the heat-insulation film 3 decreases as the aspect ratio increases. When Example 4 is compared to Examples 10 to 12, it is found that the thermal conductivity of the heat-insulation film 3 decreases as the minimum length decreases. When Example 4 is compared to Examples 13 to 15, it is found that the thermal conductivity of the heat-insulation film 3 decreases as the porosity increases. When Example 4 is compared to Examples 16 to 18, it was found that the thermal conductivity of the heat-insulation film 3 increases as the pore diameter of the circumferential part 5 of the porous plate-shaped filler 1 increases.

INDUSTRIAL APPLICABILITY

The porous plate-shaped filler of the present invention can be used as a material for a heat-insulation film having excellent heat insulation performance. The heat-insulation film of the present invention can be used as a heat-insulation film which is formed on top of a "surface constituting an engine combustion chamber".

DESCRIPTION OF REFERENCE NUMERALS

1: Porous plate-shaped filler, 3: Heat-insulation film, 3*m*: Matrix, 4: Center part, 5: Circumferential part, 8: Base

The invention claimed is:

1. A porous plate-shaped filler having a plate shape with major surfaces each of which contains a plurality of pores, a length to thickness aspect ratio of 3 or higher, a thickness of 0.5 to 50 μm, an overall porosity of 20 to 90%, and a porosity of a center part of 30 to 90%, wherein the porosity is lower in a circumferential part than in the center part.

2. The porous plate-shaped filler according to claim 1, wherein the center part and the circumferential part have the same type of material for a base material.

3. The porous plate-shaped filler according to claim 1, wherein the center part and the circumferential part have a different type of material for a base material.

4. The porous plate-shaped filler according to claim 1, wherein the type of material of the circumferential part contains at least one of a fluororesin, a silicone resin, a polyimide resin, a polyamide resin, an acrylic resin, and an epoxy resin.

5. The porous plate-shaped filler according to claim 1, wherein the circumferential part has a porosity which is lower by 10% or more than the center part.

6. The porous plate-shaped filler according to claim 1, wherein an average pore diameter is smaller in the circumferential part than in the center part.

7. The porous plate-shaped filler according to claim 1, wherein an average pore diameter of the circumferential part is 0.1 μm or less.

8. The porous plate-shaped filler according to claim 1, wherein the thickness of the circumferential part is 1 μm or more.

* * * * *